Figure 1:
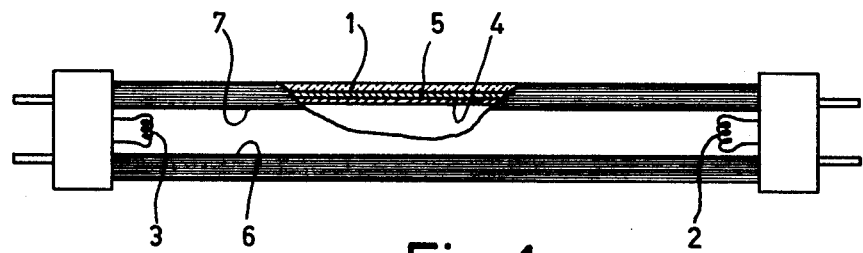

United States Patent [19]

Radielović et al.

[11] 4,005,328
[45] Jan. 25, 1977

[54] MERCURY VAPOR DISCHARGE LAMP FOR USE IN COLOR COPYING BY MEANS OF ELECTROPHOTOGRAPHIC PROCESSES

[75] Inventors: Dragutin Radielović; Cornelis Machiel Verheij, both of Eindhoven, Netherlands

[73] Assignee: U.S. Philips Corporation, New York, N.Y.

[22] Filed: Nov. 26, 1974

[21] Appl. No.: 527,241

[30] Foreign Application Priority Data

Dec. 3, 1973 Netherlands .................... 7316494

[52] U.S. Cl. .................... 313/487; 252/301.4 R
[51] Int. Cl.$^2$ ................ C09K 11/12; C09K 11/16; C09K 11/30; H01J 61/44
[58] Field of Search ............ 313/487, 486; 252/301.4 R

[56] References Cited

UNITED STATES PATENTS

| | | | |
|---|---|---|---|
| 3,569,762 | 3/1971 | Levine et al. | 313/486 |
| 3,577,350 | 5/1971 | Amster | 252/301.4 R |
| 3,595,802 | 7/1971 | Blasse | 252/301.4 R |
| 3,748,517 | 7/1973 | Haft | 313/487 |
| 3,825,792 | 7/1974 | Rokosz et al. | 313/487 |
| 3,836,477 | 9/1974 | Lagos | 252/301.4 R X |
| 3,875,453 | 4/1975 | Thornton, Jr. | 313/487 |

*Primary Examiner*—Palmer C. Demeo
*Attorney, Agent, or Firm*—Frank R. Trifari; Norman N. Spain

[57] ABSTRACT

Mercury vapor discharge lamp, in particular low pressure mercury vapor discharge lamp, for color copying by electrophotographic processes, which lamp has a luminescent layer which emits in a band in the blue part, in a band in the green part and in a band in the red part of the spectrum. The luminescent layer comprises two luminescent materials the first of which emits both in the said blue part and in the said green part of the spectrum, while the second emits in the said red part of the spectrum.

5 Claims, 2 Drawing Figures

U.S. Patent     Jan. 25, 1977     4,005,328

MERCURY VAPOR DISCHARGE LAMP FOR USE IN COLOR COPYING BY MEANS OF ELECTROPHOTOGRAPHIC PROCESSES

The invention relates to a mercury vapour discharge lamp for use in colour copying, for example colour copying of documents and the like, by means of electro-photographic processes.

In electrophotographic copying processes, for example in xerography, a photosensitive layer is used which comprises a photoconductive resistance material on which a latent electrostatic image of the subject copy is formed. This image is developed, if required transferred to another backing surface, and fixed. A general requirement to be satisfied by such copying systems is that the spectrum of the light by which the original to be copied is irradiated is matched as closely as possible to the sensitivity of the copying system. For copying subject copies in a single colour, in particular black, use is generally made of a mercury vapour discharge lamp, in particular a low pressure mercury vapour discharge lamp, which is provided with a luminescent material which emits in the green part of the spectrum, for in this case a radiation source which emits green light provides the best compromise between a satisfactory copy of the most important colours of the original and good matching to the sensitivity of the copying system.

In colour copying a radiation source is required which emits in three specific regions of the spectrum, i.e. in the blue part between 410 and 470 nm, in the green part between 485 and 550 nm and in the red part between 600 and 650 nm. A fundamental requirement is that the ratio between the powers emitted in the said spectral ranges satisfies given conditions and that in the intermediate spectral regions little radiation is emitted.

Such a radiation source is obtainable by using for each of the said spectral ranges one or more mercury vapour discharge lamps containing a material which luminesces in the relevant spectral region. For colour copying purposes it is also known to use a radiation source which comprises at least one mercury vapour discharge lamp, each lamp being provided with a mixture of three luminescent materials. The first of these luminescent materials has an emission band in the blue part of the spectrum, the second a band in the green part and the third a band in the red part. To ensure that little radiation is emitted in the intermediate spectral regions the first luminescent material is a material having a half-value width of the emission band of less than 100 nm, the second is a material having a half-value width of less than 50 nm and the third one is a material having a half-value width of less than 10 nm. An example of a suitable mixture of luminescent materials is: strontium pyrophosphate activated with divalent europium (emission maximum at 420 nm), magnesium gallate activated with divalent manganese in which part of the gallium may be replaced by aluminium and which has spinel crystal structure (emission maximum at 505 nm), and yttrium oxide activated with trivalent europium (emission maximum at 611 nm).

These known radiation sources for colour copying have considerable disadvantages. As is known, during the operative life of a mercury vapour discharge tube provided with a luminescent material the intensity of the light produced slowly diminishes. The degree of decrease depends upon various factors. One of the most important factors is the nature of the luminescent material, for it has been found that each luminescent material has a characteristic fall-off curve. Obviously a radiation source for colour copying has to satisfy the requirement that the degree of fall-off of the radiation intensity is the same in each of the said spectral ranges. That is to say, in the known radiation source the three luminescent materials used must have equal fall-off curves. It was found that this is substantially unobtainable in practice.

Another disadvantage of the known radiation source containing a mixture of three luminescent materials is that adjustment of the correct ratio of the three luminescent materials gives rise to great difficulty in practice, for it has been found that this ratio cannot accurately be deduced from calculations based on the spectral energy distribution and the quantum efficiency of the three luminescent materials used. Some of the causes for the difference found between the theoretically calculated ratio and that to be used in practice are a difference in grain size and a difference in "application stability" of the luminescent materials. The term application stability is used herein to mean the capability of a luminescent material to retain its luminescent properties when applied in a lamp. During the production of a luminescent material the acquisition of a constant grain size and constant application stability imposes exacting requirements on the technique of preparation. The ideal of equal grain size (and grain size distribution) for the three luminescent materials is attainable only with difficulty.

It is an object of the present invention to provide a mercury vapour discharge lamp for colour copying by which the above described disadvantages and drawbacks of the known lamps are largely avoided.

A mercury vapour discharge lamp for colour copying, for example of documents, by means of electrophotographic processes according to the invention is provided with a luminescent layer which emits in a band in each of the blue, green and red parts of the spectrum, the blue band having a maximum between 410 and 470 nm and a half-value width of less than 100 nm, the green band has a maximum between 485 and 550 nm and a half-value width of less than 50 nm, and the red band has a maximum between 600 and 650 nm and a half-value width of less than 10 nm, and is characterized in that the luminescent layer contains two luminescent materials the first of which emits both in the said blue part and in said green part of the spectrum, the second luminescent material emitting in said red part of the spectrum.

In a lamp according to the invention two luminescent materials are used instead of the three used in the known lamps. The first luminescent material provides two emission bands, one in the blue part and one in the green part of the spectrum. Because the two emission bands are emitted by one material, the fall-off of the luminous flux of the blue emission and that of the green emission are equal in a lamp according to the invention. Hence a large advantage of a lamp according to the invention is a highly reproducible spectral distribution of the emitted radiation which is maintained throughout the life of the lamp. Manufacture of a lamp according to the invention is considerably simpler than that of the known lamp, because only two luminescent materials are to be prepared and consequently relative matching in respect to fall-off in the lamp and possibly of grain size is considerably facilitated.

A mercury vapour discharge lamp according to the invention is preferred in which the first luminescent material contains divalent europium and divalent manganese as activators while the second luminescent material contains trivalent europium as an activator. The first luminescent material in such a lamp contains two activators, i.e. divalent europium for the blue emission band and divalent manganese for the green emission band, for the spectral distribution of the emission produced by these activators is highly suitable for the intended use. This applies also to the trivalent europium which is used as an activator in the second luminescent material and provides the red emission.

In a lamp according to the invention the first luminescent material preferably is an aluminate of barium and/or strontium which has a hexagonal crystal structure related to that of the hexagonal ferrites and is activated with divalent europium and divalent manganese. A particular advantage of these hexagonal aluminates is that the intensity in the blue and green emission bands can continuously be controlled by varying the concentrations of europium and manganese. Hence for these materials the intensity ratio in the said emission band can accurately be adapted to a requirement to be satisfied for a given use. Examples of such hexagonal aluminates are the materials defined by the formula $Me_{1-p-q}Eu_pMn_qAl_{12}O_{19}$, where Me is barium and/or strontium. These materials, which have a large luminous flux and a small drop in efficiency in the lamp, have been described in detail in Netherlands Pat. Application No. 7,214,860 (PHN. 6606) not yet laid open to public inspection.

A group of hexagonal aluminates by means of which very large luminous fluxes are obtained and which are preferentially used in a lamp according to the invention as the first luminescent material are the ternary aluminates which contain barium and/or strontium and magnesium and in which the atomic fraction of aluminium is greater than 1.8 times the atomic fraction of magnesium and also greater than 3.7 times the atomic fraction of barium and/or strontium and in which up to 25 atomic percent of the aluminium can be replaced by gallium and/or scandium whilst the magnesium may be entirely or partly replaced by zinc and/or beryllium. The said ternary hexagonal aluminates have been described in more detail in Netherlands Pat. Application No. 7,214,862 (PHN. 6604) not yet laid open to public inspection.

In a preferred embodiment of a lamp according to the invention the first luminescent material is such a ternary aluminate which has a composition defined by either of the formulae

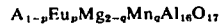 (1)

 (2)

where A is substantially barium and B is substantially strontium and $0.05 \leq p \leq 0.20$ $0.25 \leq x \leq 1.50$ $1 \leq q/p \leq 6$ $1 \leq y/x \leq 6.$ The aluminates defined by the above formula (1) have an emission maximum at 452 nm ($Eu^{2+}$) and an emission maximum at 515 nm ($Mn^{2+}$). The europium emission of the materials defined by the formula (2) has a maximum at 468 nm, whilst the manganese emission has its maximum at 515 nm. The europium concentrations p and x in the materials defined by the formulae (1) and (2) respectively are selected to lie in the aforedescribed ranges, for then the largest luminous fluxes are obtained by these materials. Suitable ratios of the intensity in the green manganese band to that in the blue europium band are obtained if the ratio q/p or y/x respectively has a value between 1 and 6.

In a lamp according to the invention the second luminescent material preferably is at least one of the following known materials: the oxides of at least one of the elements yttrium, lanthanum, gadolinium and lutetium, and the yttriumvanadate which is activated with trivalent europium and in which the vanadium may partly be replaced by phosphorus and/or boron, for these materials have very large luminous fluxes and only slight drop in luminous flux in the lamp.

A lamp according to the invention is preferred in which the ratio of the energy emitted in the blue part of the spectrum to that emitted in the green part of the spectrum has a value between 0.4 and 1.0 and the ratio between the energy emitted in the red part of the spectrum to that emitted in the green part of the spectrum also has a value between 0.4 and 1.0, for these values of the said ratios provide best matching to the sensitivity of the electrophotographic copying equipment.

A lamp according to the invention preferably takes the form of a low pressure mercury vapour discharge lamp. This type of lamp was found to have many advantages when used in photographic machines. To obtain a linear source of light of high brightness such a lamp may be in the form of what is generally referred to as a slot lamp in which a slot-shaped window situtated between two generating lines of the cylindrical lamp envelope is free from the luminescent layer. A high concentration of the luminous flux is possible also if within the lamp envelope a reflector layer is interposed between the lamp wall and the luminescent layer on part of the lamp wall. Such a reflector layer may also be used in conjunction with a slot-shaped window in the luminescent layer.

Figure 2:
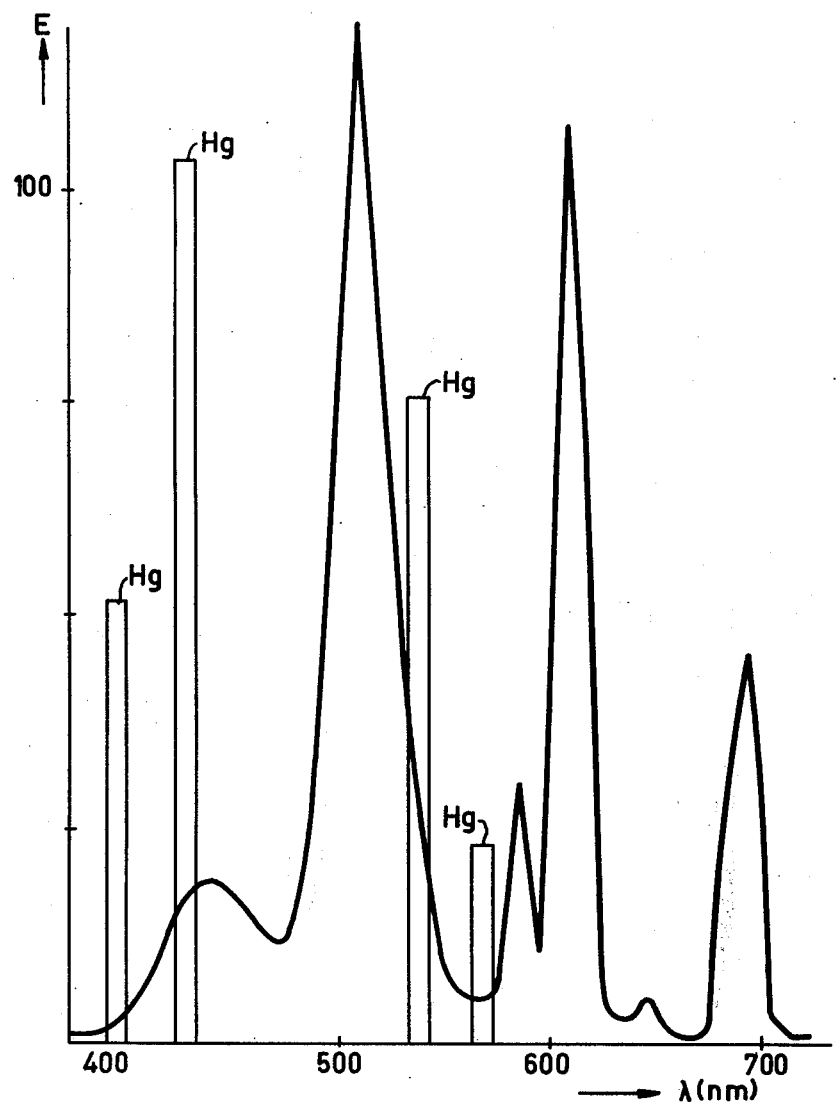

An embodiment of the invention will now be described, by way of example, with reference to the accompanying diagrammatic drawings, in which FIG. 1 shows schematically and partly in section a low pressure mercury vapour discharge lamp according to the invention, and FIG. 2 shows the spectral energy distribution of the radiation emitted by a lamp according to the invention.

Referring now to FIG. 1, reference numeral 1, denotes the cylindrical glass envelope of a low pressure mercury vapour discharge lamp. Electrodes 2 and 3 between which in operation the discharge is maintained are disposed at the ends of the lamp. The envelope 1 is internally coated with a luminescent layer 4 which comprises a mixture of luminescent materials according to the invention. Part of the cylindrical envelope 1 between lines 6 and 7 is free from the luminescent layer and thus forms a window. The angle which this window subtends at the axis of the lamp is 45°. A reflector layer 5 is interposed between the luminescent layer 4 and the envelope 1. The lamp has a length of 46.3 cm and a diameter of 2.6 cm and in operation absorbs a current of 1.5 amperes at a power of 30 watts.

An embodiment of a lamp according to the invention having the construction illustrated in FIG. 1 was coated with a reflector layer of titanium dioxide (coating weight 1.3 g) and with a luminescent layer (coating weight 1.0 g) which consisted of a mixture of 65% by weight of $Ba_{0.9}Eu_{0.1}Mg_{1.77}Mn_{0.23}Al_{16}O_{27}$ and 35% by weight of $Y_{0.95}Eu_{0.05}V_{0.5}P_{0.5}O_4$ and in which a small part of the vanadium and the phosphorus is replaced by boron. Measurements of the radiant energy emitted by this lamp in the three relevant spectral regions gave the following results:

| Spectral regions | Energy (in arbitrary inits) |
|---|---|
| red | 28 |
| green | 48 |
| blue | 24 |

It was found that in the operation of the lamp the drop in radiation intensity in the said three spectral regions was small and had substantially the same values for the three regions, as is shown by the following measurements:

| Operating hours | Luminous flux (in %) in the spectral regions | | |
|---|---|---|---|
| | red | green | blue |
| 0 | 100 | 100 | 100 |
| 25 | 94.9 | 95.8 | 95.6 |
| 50 | 92.2 | 93.2 | 92.8 |
| 75 | 90.8 | 91.4 | 91.2 |
| 100 | 90.0 | 90.8 | 90.4 |

FIG. 2 is a graph illustrating the spectral energy distribution of the abovedescribed embodiment of a lamp according to the invention. The wavelength $\lambda$ in nm is plotted on the horizontal axis, and the emitted radiant energy E in arbitrary units is plotted on the vertical axis. The visible mercury lines emitted by the lamp are shown by columns denoted by Hg in the graph.

What is claimed is:

1. A mercury vapor discharge lamp particularly useful for color copying by electrophotographic processes, said lamp comprising: a sealed radiation-transmitting envelope having discharge electrodes disposed at approximately the ends thereof and containing a small amount of mercury and inert ionizable gas, said envelope being coated on the interior surface thereof with a luminescent layer emitting in bands in the blue, green and red regions of the spectrum, said luminescent layer consisting essentially of two phosphors, the first of said phosphors emitting in bands both in the blue and in the green regions of the spectrum, the blue band having a maximum between 410 and 470 nm and a half-value width of less than 100 nm and the green band having a maximum of between 485 and 550 nm and a half value width of less than 100 nm and being a divalent europium and divalent manganese activated aluminate of barium, strontium or mixtures thereof and having a hexagonal crystal structure similar to that of the hexagonal ferrites and the second of said phosphors containing trivalent europium as an activator and emitting in a band in the red part of the spectrum, said red band having a maximum of between 600 and 650 nm and a half-value width of less than 10 nm.

2. Mercury vapour discharge lamp as claimed in claim 1, characterized in that the ratio of the energy emitted in the blue part of the spectrum to that emitted in the green part of the spectrum has a value between 0.4 and 1.0, and in that the ratio of the energy emitted in the red part of the spectrum to that emitted in the green part of the spectrum has a value between 0.4 and 1.0.

3. The mercury vapor discharge lamp of claim 1 wherein the first phosphor is a ternary aluminate of barium or strontium or mixtures thereof and of magnesium, the atomic fraction of aluminum in said phosphor being greater than 1.8 times the atomic fraction of magnesium and 3.7 times the atomic fraction of barium and strontium present therein, up to 25 atom % of the aluminum in said phosphor being replaceable by gallium, scandium or mixtures thereof and all of the magnesium in said phosphor being replaceable by zinc, beryllium or mixtures thereof.

4. Mercury vapour discharge lamp as claimed in claim 3, characterized in that the first phosphor has a composition defined by either of the formulae

$A_{1-p}Eu_pMg_{2-q}Mn_qAl_{16}O_{17}$ and

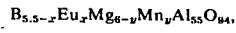

$B_{5.5-x}Eu_xMg_{6-y}Mn_yAl_{55}O_{94}$, where A is mainly barium and B is mainly strontium and $0.05 \leq p \leq 0.20$
$0.25 \leq x \leq 1.50$
$1 \leq q/p \leq 6$
$1 \leq y/x \leq 6$.

5. The mercury vapor discharge lamp of claim 1 wherein the second phosphor is a trivalent europium activated member selected from the group consisting of yttrium vandadate, oxides of at least one element selected from the group consisting of yttrium, lanthanum, gadolinium, and lutetium phosphorus substitution products of said yttrium vandadate and boron substitution products of said yttrium vandadate.

* * * * *